T. KURODA.
FRUIT PICKER'S SACK.
APPLICATION FILED JAN. 6, 1913.
1,070,489.
Patented Aug. 19, 1913.
2 SHEETS—SHEET 1.
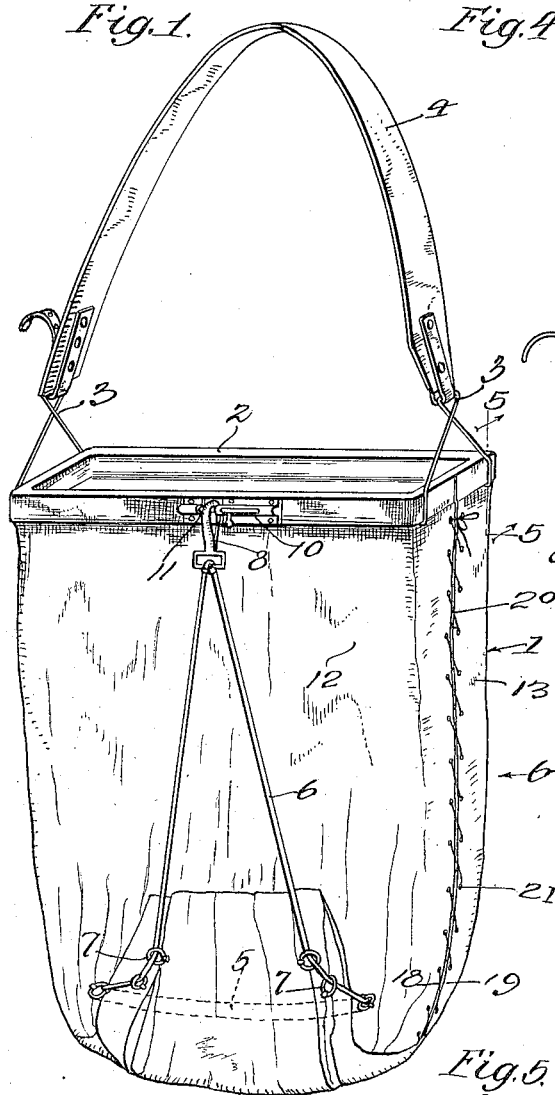
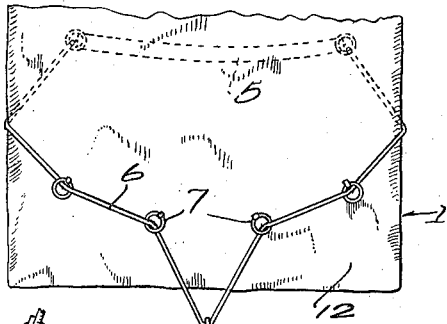
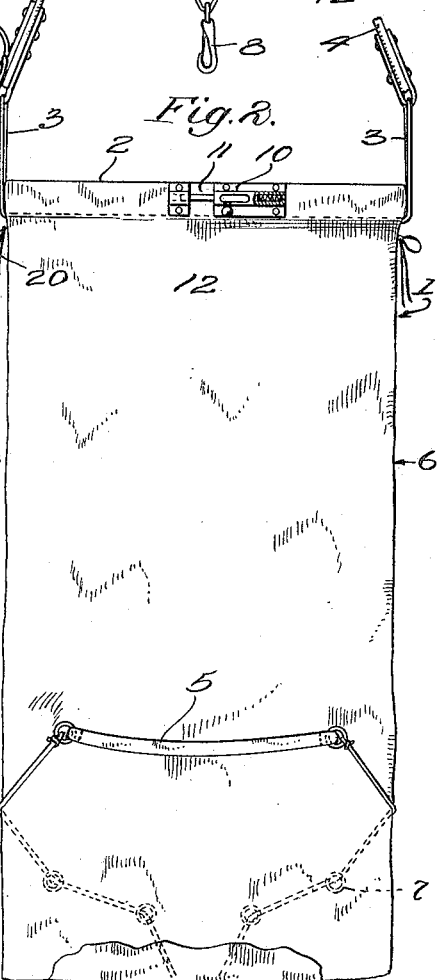
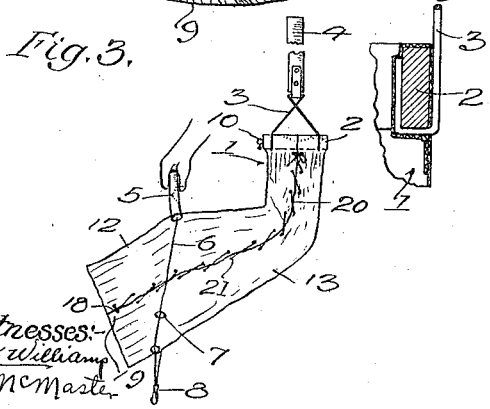
Inventor
Tsunesaburo Kuroda
by Demer G. Wells
his Attorney
Witnesses:
C. J. Williams
B. McMaster T. KURODA.
FRUIT PICKER'S SACK.
APPLICATION FILED JAN. 6, 1913.
1,070,489.
Patented Aug. 19, 1913.
2 SHEETS—SHEET 2.
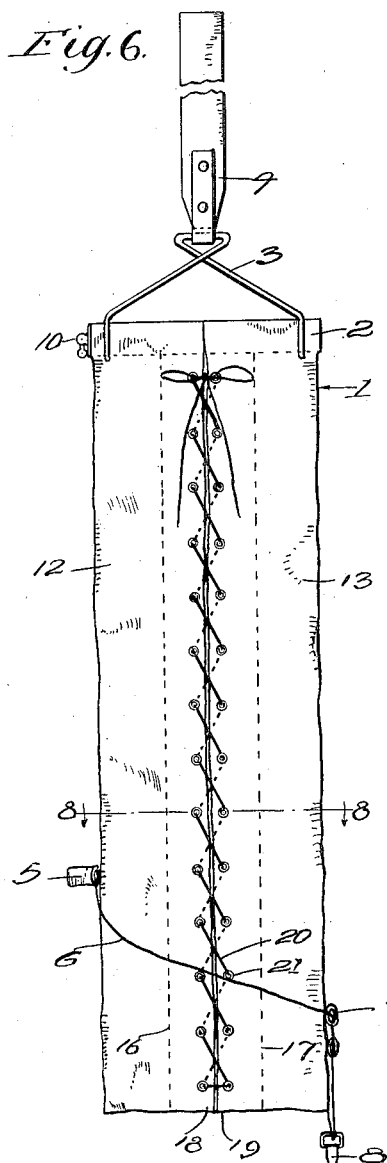
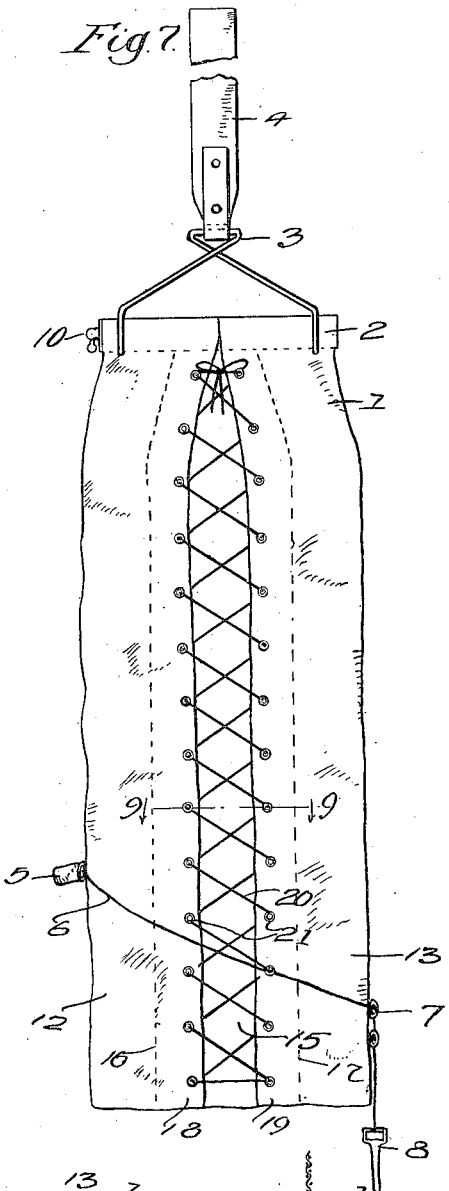
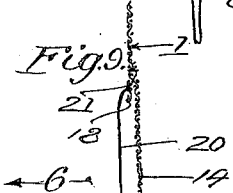
Witnesses:
C. J. Williams
B. McMaster
Inventor
Tsunesaburo Kuroda
by Semer G. Wells,
his attorney

UNITED STATES PATENT OFFICE.

TSUNESABURO KURODA, OF EL MONTE, CALIFORNIA.

FRUIT-PICKER'S SACK.

1,070,489. Specification of Letters Patent. Patented Aug. 19, 1913.

Application filed January 6, 1913. Serial No. 740,412.

*To all whom it may concern:*

Be it known that I, TSUNESABURO KURODA, a subject of Japan, residing at El Monte, county of Los Angeles, State of California, have invented a new and useful Fruit-Picker's Sack, of which the following is a specification.

My object is to make a receptacle to be used in picking fruit, such as oranges, apples and the like, and having a collapsible bottom for convenience in emptying the fruit, and having means for expansion and contraction.

In the drawings—Figure 1 is a perspective of a fruit picker's sack embodying the principles of my invention, with the bottom closed ready for use. Fig. 2 is a fragmentary side elevation, with the bottom collapsed or open. Fig. 3 is a diagrammatic view illustrating the operation. Fig. 4 is a fragmentary side elevation of the lower end of the sack open, the view being drawn to show the opposite side of the sack from that shown in Fig. 2. Fig. 5 is an enlarged sectional detail on the line 5—5 of Fig. 1. Fig. 6 is a side elevation of the distended or open sack contracted for small measures, as seen looking in the direction indicated by the arrows in Figs. 1, 2 and 8. Fig. 7 is a view analogous to Fig. 6 and showing the sack expanded for larger measures. Fig. 8 is a horizontal cross section on the line 8—8 of Fig. 6. Fig. 9 is a fragmentary cross section on the line 9—9 of Fig. 7.

Referring to the drawings in detail: The upper or receiving end of the sack 1 is attached to a rectangular open frame 2. Ears 3 are attached to the ends of the frame 2 and a shoulder strap 4 connects the ears 3. The sack 1 is normally open at the bottom. A hand-strap 5 is secured at its ends to the outer side of the sack 1 some distance above the lower end of the sack, said ends being a considerable distance apart in a horizontal line. The gathering cord 6 is attached at the ends of the hand-strap 5 and passes around the sack through guide rings 7 and a snap 8, said snap being at the center of the cord, so that when the snap is passed upwardly on the outer side of the sack and drawn taut, the lower end of the sack is gathered and folded upon itself and forms a bottom 9. A sliding bolt mechanism 10 is fixed upon the outer side of the frame 2 and the snap 8 may be drawn up to engage this bolt. When it is desired to release the snap 8, the bolt is operated to move out of the passageway 11.

The sack 1 is preferably made in two pieces 12 and 13 meeting upon vertical lines at the centers of the ends of the frame 2. Strips 14 and 15 are inserted and secured to the pieces 12 and 13 upon the lines 16 and 17, some distance from the meeting edges 18 and 19, and laces 20 are run through eyelets 21 fixed near the edges 18 and 19.

When it is desired to fix the sack so that a sackful of fruit will fill a certain small box or measure, the laces 20 are tightened up to bring the edges 18 and 19 together, and when it is desired to fix the sack to hold fruit sufficient to fill a certain larger box, the laces 20 are loosened up to the desired extent. In this way I provide a considerable latitude of adjustment for the expansion and contraction of the sack, so that the sack may be fixed to accurately measure the fruit or to make a sackful of fruit accurately fill certain measures or boxes, and so that the same sack may be used for large or small boxes.

When a sack has been filled with fruit and carried to the emptying place, the snap 8 is released from the sliding bolt 10 and dropped and the hand-strap 5 is elevated so as to open the bottom of the sack as shown in Fig. 3. This hand-strap 5 is very useful where it is desired to dump the fruit into the upper ones of a stack of boxes.

By the use of my sack the fruit may be discharged gradually through the more or less gathered lower end and deposited easily in the box without bruising the fruit.

The details of construction may be varied in many ways without departing from the spirit of my invention as set up in the following claim.

I claim—

In a fruit picker's sack, a rectangular open frame; a sack attached to the open frame, said sack consisting of two pieces meeting upon vertical lines at the centers of the ends of the frame; strips inserted and secured to the pieces on vertical lines some distance from the meeting edges, and laces run through said meeting edges so that by manipulating the laces the sack may be contracted or expanded; a hand strap secured at its ends to the outer side of the sack some distance above the lower end of the sack; the ends of said hand strap being a considerable distance apart in a horizontal line; and a gathering cord attached to the ends of the hand strap and passed around the sack, there being guide rings and a snap through which the cord passes, said snap being at the center of the cord; so that when the snap is passed upwardly on the outer side of the sack and attached to the bag the cord is drawn taut and the lower end of the sack is gathered and folded upon itself; and so that when the gathering cord is released and the hand strap is elevated the sack may be emptied.

TSUNESABURO KURODA.

Witnesses:
BERTHA MCMASTER,
SEMER G. WELLS.